(12) United States Patent
Card, II

(10) Patent No.: US 8,675,872 B2
(45) Date of Patent: Mar. 18, 2014

(54) SECURE CONTENT DISTRIBUTION APPARATUS, SYSTEMS, AND METHODS

(75) Inventor: John A. Card, II, Denver, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 1448 days.

(21) Appl. No.: 11/946,743

(22) Filed: Nov. 28, 2007

(65) Prior Publication Data

US 2009/0136028 A1 May 28, 2009

(51) Int. Cl.
*H04N 7/167* (2011.01)

(52) U.S. Cl.
USPC ............... 380/200; 380/277; 380/279; 726/2; 726/26; 726/27

(58) Field of Classification Search
USPC ................. 380/240, 258, 284, 200, 277, 279; 726/2, 26, 27
See application file for complete search history.

(56) References Cited

U.S. PATENT DOCUMENTS

| | | | |
|---|---|---|---|
| 7,092,729 | B1 | 8/2006 | Fichet et al. |
| 7,870,386 | B2 * | 1/2011 | Forlenza et al. ............... 713/165 |
| 2002/0106086 | A1 | 8/2002 | Kamiya et al. ................. 380/277 |
| 2002/0184515 | A1 * | 12/2002 | Oho et al. ........................ 713/193 |
| 2004/0052377 | A1 * | 3/2004 | Mattox et al. .................. 380/277 |
| 2005/0100167 | A1 | 5/2005 | Alve et al. |
| 2005/0147246 | A1 * | 7/2005 | Agrawal et al. ................. 380/44 |
| 2006/0107285 | A1 | 5/2006 | Medvinsky ....................... 725/25 |
| 2007/0162956 | A1 * | 7/2007 | Tucker et al. ..................... 726/2 |
| 2007/0180464 | A1 * | 8/2007 | Dellow et al. .................... 725/31 |
| 2007/0258596 | A1 * | 11/2007 | Kahn et al. ...................... 380/284 |
| 2008/0192934 | A1 * | 8/2008 | Nelger et al. .................. 380/258 |
| 2008/0219449 | A1 * | 9/2008 | Ball et al. ....................... 380/277 |
| 2010/0063931 | A1 * | 3/2010 | Cole et al. ........................ 705/51 |
| 2010/0304852 | A1 * | 12/2010 | Szrek et al. ..................... 463/29 |

FOREIGN PATENT DOCUMENTS

| | | |
|---|---|---|
| EP | 1111923 A1 | 6/2001 |
| WO | 2006002238 A2 | 1/2006 |

OTHER PUBLICATIONS

B.M Macq; Cryptology for Digital TV Broadcasting; IEEE, vol. 83, No. 6, Jun. 1995; pp. 1-19.*
Rivest et al., "Chaffing and Winnowing: Confidentiality without Encryption," MIT Lab for Computer Science, Mar. 18, 1998, URL=http://people.csail.mit.edu/rivest/Chaffing.txt, download date Dec. 17, 2007.
Examination Report dated Jul. 25, 2012, for corresponding European Patent Application No. 08170122.9, 7 pages.

* cited by examiner

*Primary Examiner* — Aravind Moorthy
*Assistant Examiner* — Joseph Pan
(74) *Attorney, Agent, or Firm* — Seed IP Law Group PLLC (57) ABSTRACT

Various embodiments facilitate program content access management. One embodiment is a system with a secure content provider communicatively coupled to a first system and a second system, operable to stream encrypted content over the first system, and operable to communicate access control information over the second system; and a receiving device coupled to the first system and the second system, operable to receive the encrypted program content from the first system, operable to receive the access control information over the second system such that the encrypted program content is decrypted based on the access control information to generate program content, and operable to communicate the program content to a presentation device.

23 Claims, 8 Drawing Sheets

SECURE CONTENT DISTRIBUTION APPARATUS, SYSTEMS, AND METHODS

TECHNICAL FIELD

The technical field relates to secure content distribution systems and methods for audio/video/data content providers and, more particularly, to systems and methods for content access control via a backchannel distribution system.

SUMMARY

In one embodiment, a method to manage access to program content is provided. The method comprises receiving encrypted program content via a satellite communication system; receiving a decryption key operable to enable decryption of the encrypted program content via a telephony network; and decrypting the encrypted program content with the encryption key.

In another embodiment, an apparatus that manages access to encrypted program content is provided. The apparatus comprises a content stream selection device operable to receive encrypted program content via a content distribution system; a port communicatively coupled to an access control information distribution system, the port operable to receive access control information from the access control information distribution system, the access control information distribution system being separate from the content distribution system; and a content access controller communicatively coupled to the port and to the content stream selection device, the content access controller operable to decrypt the received encrypted program content based on the received access control information.

In another embodiment, a system that manages access to encrypted program content is provided. The system comprises a secure content provider communicatively coupled to a first system and a second system, operable to stream encrypted content over the first system, and operable to communicate access control information over the second system; and a receiving device coupled to the first system and the second system, operable to receive the encrypted program content from the first system, operable to receive the access control information over the second system such that the encrypted program content is decrypted based on the access control information to generate program content, and operable to communicate the program content to a presentation device.

In another embodiment, a computer-readable medium is provided. The computer-readable medium contents enable a computing system to manage access to program content, by performing a method comprising: receiving encrypted program content via a content distribution system; receiving access control information via an access control information distribution system, the access control information distribution system being at least in part physically distinct from the content distribution system; and determining a decryption key based on the received access control information, the decryption key operable to decrypt the encrypted program content.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

A. Communication System Overview

Figure 1:
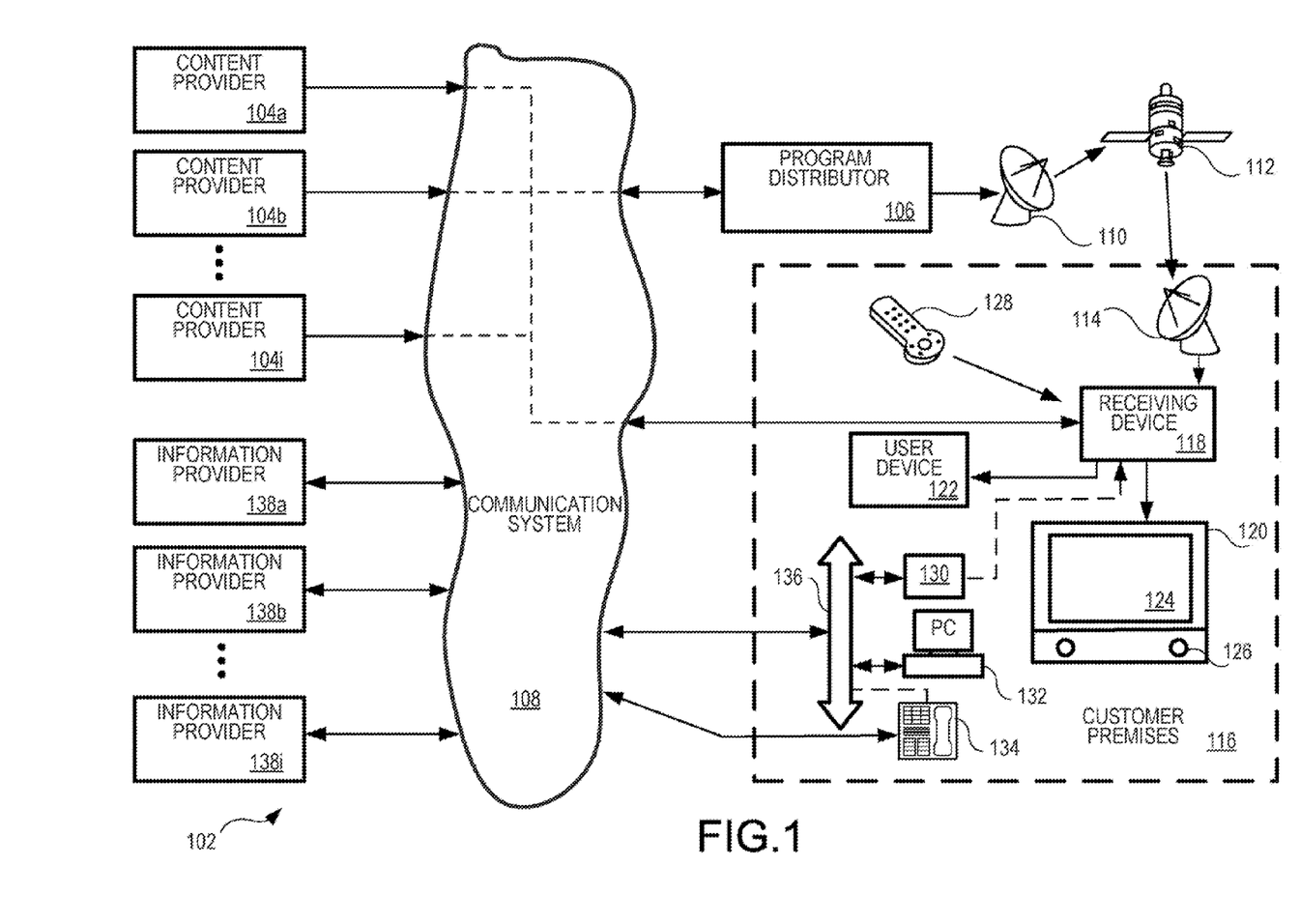
FIG. 1 is a block diagram illustrating an exemplary communication system in which embodiments of a secure content distribution system may be implemented.

FIG. 1 is an overview block diagram illustrating an exemplary communication system 102 in which embodiments of a secure content distribution system may be implemented. It is to be appreciated that FIG. 1 is just one example of a communications system and that the various embodiments discussed herein are not limited to such exemplary systems. Communication system 102 can include a variety of communication systems and can use a variety of communication media including, but not limited to, satellite wireless media.

Television service providers provide their customers a multitude of audio/video and/or data programming (hereafter, collectively and/or exclusively "programming"). Such programming is often provided by use of a receiving device 118 (FIG. 1) communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," and/or "television tuner." Accordingly, the receiving device 118 may be any suitable converter device or electronic equipment that is operable to receive programming. Further, the receiving device 118 may itself include user interface devices, such as buttons or switches. In many applications, a remote 128 is operable to control the presentation device 120 and other user devices 122.

Presentation device 120 includes any device configured to communicate video, audio, and/or any other perceptible signal to a user. Examples of a presentation device 120 include, but are not limited to, a television (TV), a personal computer (PC), a sound system receiver, a digital video recorder (DVR), a compact disk (CD) device, a game system, or the like. Presentation devices 120 may employ a display, one or more speakers 126, and/or other output devices to communicate video and/or audio content to a user. In some implementations, one or more presentation devices 120 reside in or near a customer's premises 116 and are communicatively coupled, directly or indirectly, to the receiving device 118. Further, the illustrated devices/components may be integrated in various ways. For example, devices such as the receiving device 118, the presentation device 120, and/or the user device 122 may be integrated into a single device, such as a "smart television." Such a single device may have some or all of the functionality of the receiving device 118, the presentation device 120, the user device 118, and may even have additional functionality.

Some customer premises 116 include a network 136, or a networked system, to which receiving devices 118, presentation devices 129, and/or a variety of user devices 122 can be coupled, collectively referred to as endpoint devices. Non-limiting examples of network 136 include, but are not limited to, an Ethernet, twisted pair Ethernet, an intranet, a local area network (LAN) system, or the like, one or more endpoint devices, such as PCs, data storage devices, TVs, game systems, sound system receivers, Internet connection devices, digital subscriber loop (DSL) devices, wireless LAN, WiFi, Worldwide Interoperability for Microwave Access (WiMax), or the like, are communicatively coupled to network 136 so that the plurality of endpoint devices are communicatively coupled together. Thus, the network 136 allows the interconnected endpoint devices, and the receiving device 118, to communicate with each other.

A plurality of content providers 104a-104i provide program content, such as television content or audio content, to a distributor, such as the program distributor 106. Exemplary content providers 104a-104i include television stations which provide local or national television programming, special content providers which provide premium based programming or pay-per-view programming, or radio stations which provide audio programming.

Program content, interchangeably referred to as a program, is communicated to the program distributor 106 from the content providers 104a-104i through suitable communication media, generally illustrated as communication system 108 for convenience. Communication system 108 may include many different types of communication media, now known or later developed. Non-limiting media examples include telephony networks, the Internet, internets, cable systems, fiber optic systems, microwave systems, asynchronous transfer mode (ATM) systems, frame relay systems, digital subscriber loop (DSL) systems, cellular radio frequency (RF) systems, and satellite networks. Further, program content communicated from the content providers 104a-104i to the program distributor 106 may be communicated over combinations of media. For example, a television broadcast station may initially communicate program content, via an RF signal or other suitable medium, that is received and then converted into a digital signal suitable for transmission to the program distributor 106 over a fiber optics system. As another nonlimiting example, an audio content provider may communicate audio content via its own satellite network to the program distributor 106. In addition, in some cases, multiple distinct programs, possibly originating with multiple distinct content providers 104a-104i, may be communicated via a single medium. For example, different programs may be communicated via separate radio frequencies.

In at least one embodiment, the received program content is converted by one or more devices (not shown) as necessary at the program distributor 106 into a suitable signal that is communicated (i.e.; "uplinked") by one or more antennas 110 to one or more satellites 112 (separately illustrated herein from, although considered part of, the communication system 108). It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

A receiver antenna 114 that is within reception range of the downlink signal communicated from satellite 112 receives the above-described downlink signal. A wide variety of receiver antennae 114 are available. Some types of receiver antennae 114 are operable to receive signals from a single satellite 112. Other types of receiver antennae 114 are operable to receive signals from multiple satellites 112. Other types of receiver antennae 114 may be operable to receive different types of signals from one or more distinct sources, such as from multiple satellites 112 and/or from terrestrial based transmitters.

The receiver antenna 114 can be located at a customer premises 116. Examples of customer premises 116 include a residence, a business, or any other suitable location operable to receive signals from satellite 112. The received signal is communicated, typically over a hard-wire connection, to a receiving device 118. Receiving device is a conversion device that converts, also referred to as formatting, the received signal from antenna 114 into a signal suitable for communication to a presentation device 120 and/or a user device 122. Often, the receiver antenna 114 is of a parabolic shape that may be mounted on the side or roof of a structure. Other antenna configurations can include, but are not limited to, phased arrays, wands, or other dishes.

The received signal communicated from the receiver antenna 114 to the receiving device 118 is a relatively weak signal that is amplified, and processed or formatted, by the receiving device 118. The amplified and processed signal is then communicated from the receiving device 118 to a presentation device 120 in a suitable format, such as a television (TV) or the like, and/or to a user device 122. It is to be appreciated that presentation device 120 may be any suitable device operable to present a program having video information and/or audio information.

User device 122 may be any suitable device that is operable to receive a signal from the receiving device 118, another endpoint device, or from other devices external to the customer premises 116. Additional non-limiting examples of user device 122 include optical media recorders, such as a compact disk (CD) recorder, a digital versatile disc or digital video disc (DVD) recorder, a digital video recorder (DVR), or a personal video recorder (PVR). User device 122 may also include game devices, magnetic tape type recorders, RF transceivers, and personal computers (PCs).

Interface between the receiving device 118 and a user (not shown) may be provided by a hand-held remote device 128. Remote 128 typically communicates with the receiving device 118 using a suitable wireless medium, such as infrared (IR), RF, or the like. Other devices (not shown) may also be communicatively coupled to the receiving device 118 so as to provide user instructions. Non-limiting examples include game device controllers.

The receiving device 118 may receive content partially from, or entirely from, another source other than the above-described receiver antenna 114. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

It is appreciated that it is not practical to list or describe herein all of the possible types of set-top boxes 118, presentation devices 120, user devices 122, remotes 128, intermediary devices 130, or their equivalents. Further, it is appreciated that it is not practical to list or describe herein all of the possible types of interconnectivity and/or forms of media by which a receiving device 118 may receive program content. However, all such possible devices, types of interconnectivity, and media forms are intended to be included within the scope of this disclosure. Examples of such devices, types of interconnectivity, and/or media forms are further described in greater detail hereinbelow.

Customer premises 116 may include other devices which are communicatively coupled to communication system 108 via a suitable media. For example, personal computer (PC) 132 may be communicatively coupled to the communication system 108 via the network 136. Alternatively, devices in the customer premises 116 may be directly connected to the communication system 108, such as the telephone 134 which may employ a hardwire connection or an RF signal for coupling to communication system 108.

A plurality of information providers 138a-138i are coupled to communication system 108. Information providers 138a-138i may provide various forms of content and/or services to the various devices residing in the customer premises 116. For example, information provider 138a may provide requested information of interest to PC 132. Information providers 138a-138i may further perform various transactions, such as when a user purchases a product or service via their PC 132.

The above description of the communication system 102, and the various devices therein, is intended as a broad, non-limiting overview of an exemplary environment in which various embodiments of a secure content distribution system may be implemented. The communication system 102, and the various devices therein, may contain other devices, systems and/or media not specifically described herein.

The content providers 104a-104i, the information providers 138a-138i, and/or the program distributor 106 may restrict access to program content, such that distributed program content may only be viewed and/or otherwise accessed by authorized users. In some instances, access to program content may be controlled by physical limitations, such as by the design of physical network architectures. For example, a cable system may be designed in such a manner that signals carrying program content are not transmitted to residences that are not occupied by paying customers.

In other instances, access to program content may be controlled by encrypting the program content, such that only authorized devices and/or users may access the program content. For example, if the program distributor provides content via a satellite network comprising antenna 110 and satellite 112, then any person in possession of a receiving device 118 can receive the signal or signals carrying the program content and thereby access the program content. In order to control access to the program content, the program distributor 106 may encrypt the program content prior to its transmission, such that even if an unauthorized receiving device 118 receives the program content, it cannot access the program content unless it can obtain the appropriate decryption key. In some cases, decryption keys may be provided via the satellite network that also carries the encrypted program content. However, because unauthorized receiving devices 118 can monitor the transmission of both the encrypted content and the decryption keys, such a technique may be susceptible to various attacks aimed at recovering the decryption keys for purposes of unauthorized access.

Accordingly, the various embodiments disclosed herein, whether used singularly or in combination, may use and/or provide various techniques to facilitate secure distribution of program content and/or other information. The embodiments may include controlling access to program content and/or other types of data that is distributed to receiving devices 118 configured to present or otherwise utilize the program content. Access may be controlled by providing encrypted program content to a receiving device 118 via a content distribution system, such as a satellite network comprising antennas 110 and 114 and satellites 112, and separately providing access control information to the receiving device 118 via an access control information system that is distinct from the content distribution system. In some cases, the access control information distribution system may be a "backchannel" or other link communicatively coupled to the receiving device 118, such as may be provided by the communication system 108.

The receiving device 118 may then access the received program content by using the received access control information. In some embodiments, the receiving device 118 may determine a decryption key based on the received access control information. Determining a decryption key may include generating, recovering, decrypting and/or otherwise obtaining the decryption key. The receiving device 118 may then use that decryption key to decrypt the received encrypted program content. Having decrypted the received encrypted program content, the receiving device 118 may then initiate presentation of the decrypted program content on an associated presentation device 120, such as by displaying it on a television or other display, playing it on a speaker, or the like. In at least some embodiments, some of the described techniques are performed by a secure content distribution system ("SCDS"), described below.

B. Secure Content Distribution System Overview

Figure 2:
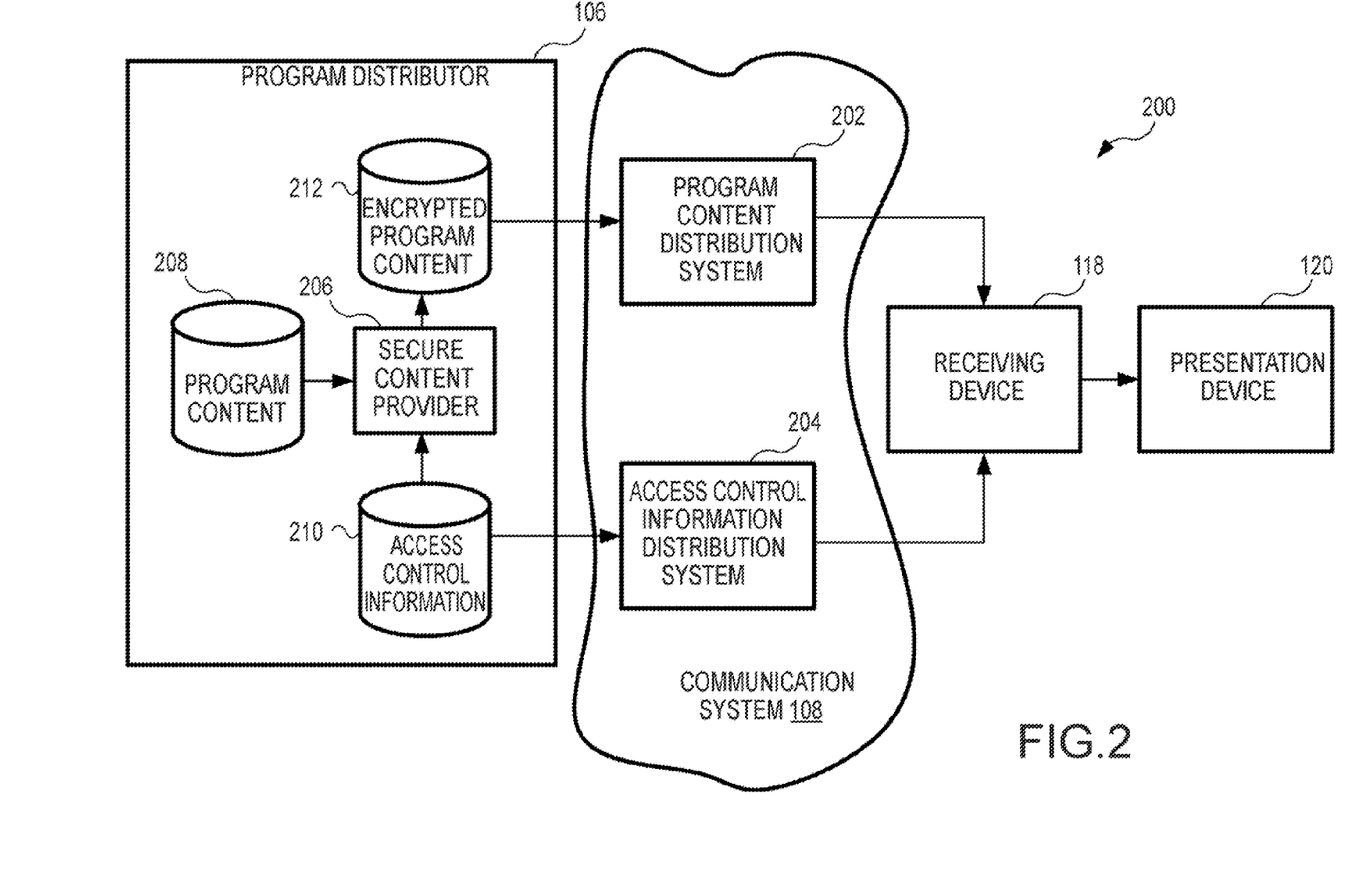
FIG. 2 is a block diagram illustrating data flow between portions of an example embodiment of a secure content distribution system.

FIG. 2 is a block diagram illustrating data flow between portions of an example embodiment of a secure content distribution system (SCDS) 200. The illustrated SCDS 200 includes a program distributor 106, a program content distribution system 202, an access control information distribution system 204, and a receiving device 118.

The program distributor 106 includes a secure content provider 206 that generates encrypted program content 212 based on program content 208 and access control information 210. The encrypted program content 212 may include an encrypted representation of all or some of the program content 208. For example, but not limited to, when the program content 208 includes video and audio tracks, the secure content provider 206 may encrypt only a portion of the program content 208, such as just the video track or the audio track, or just a portion of the video or audio tracks, such as every fifth second of video or audio. The program content 208 may be obtained from various sources, such as content providers 104a-104i and/or information providers 138a-138i, as described with reference to FIG. 1. The secure content provider 206 encrypts the program content 208 based on access control information 210. In the illustrated embodiment, the secure content provider 206 encrypts program content by utilizing an implementation of a symmetric key algorithm (i.e., private key cryptography), such as DES ("Data Encryption Standard"), Triple DES, AES ("Advanced Encryption Standard"), Blowfish, RC4, RC5, RC6, Vernam Ciphers, or the like. However, other types of encryption algorithms may be utilized instead of, or in addition to, symmetric key algorithms, including asymmetric key algorithms (i.e., public key cryptography) such RSA ("Rivest, Shamir, Adleman"), ElGamal, or the like.

The secure content provider 206 takes program content 208 and access control information 210 as inputs. The access control information 210 includes one or more keys that are used by the secure content provider 206 to encrypt the program content 208, and to produce the encrypted program content 212, in accordance with a symmetric key encryption algorithm.

Upon generating the encrypted program content 212, the program distributor 106 communicates the encrypted program content via program content distribution system 202 to the receiving device 118. Communicating the encrypted program content may include streaming, sending, transmitting, forwarding, or the like, the encrypted program content. In addition, the program distributor 106 communicates the access control information 210 via access control information distribution system 204 to the receiving device 118.

The program content distribution system 202 and the access control information distribution system 204 are separate communication systems, at least in part, for the final portion that delivers the encrypted program content 212 to the receiving device 118 and that delivers the access control information 210 to the receiving device 118, as described in greater detail below. The content distribution system 202 and the access control information distribution system 204 are portions of communication system 108. System 202, 204 may be single dedicated systems, or hybrid systems that employ different types of communication media and/or systems. It is to be appreciated that portions of the network 202, 204 may commonly share a communication media and/or system at some point in the transmission of the encrypted program content 212 and the access control information 210, respectively, to the receiving device 118.

The program content distribution system 202 may include any communication media, intermediary devices and/or systems capable of communicating the encrypted program content 212 from the program distributor 106 to the receiving device 118. Example systems include, but are not limited to, satellite communication systems, cable systems, fiber optic systems, telephony networks, or the like.

The access control information distribution system 204 may include any communication media and/or intermediary devices and/or systems capable of communicating the access control information 210 from the program distributor 106 to the receiving device 118. Example distribution systems include, but are not limited to, satellite communication systems/networks, cable systems/networks, fiber optic systems, telephony systems/networks, tangible item delivery systems, or the like. Item delivery systems may include public and/or private delivery systems, such as the postal service, courier services, package delivery services, or the like. In some embodiments, the access control information distribution system 204 is a point-to-point or end-point-identifiable communication system that is verifiable, authenticated, and/or provides a minimal acceptable level of security. For example, a theoretically insecure link may in some cases be utilized, provided that the cost of performing known attacks is greater than the benefit that may be gained by a potential attacker. Examples of such systems may include, but are not limited to, telephony links, network links established via secure networking protocols (e.g., SSL), physical item delivery with proof of delivery, etc.

The encrypted program content 212 and the access control information 210 may be communicated to the receiving device 118 via distinct distribution systems 202 and 204. In other embodiments, at least some of the access control information 210 and/or the encrypted program content 212 may be provided at least in part via both distribution systems 202 and 204. As a non-limiting example, some of the access control information 210 may be provided along with the encrypted program content 212 via the program content distribution system 202. When the program content distribution system 202 is a satellite network and the access control information distribution system 204 is a telephony network, the program distributor 106 may provide valid and invalid keys along with program content distributed via the satellite network, but only provide an indication of which keys are valid via the telephony network, such that only receiving devices 118 that may be properly authenticated, such as receiving devices 118 that are associated with paying customers, via the telephony network 320 can correctly decrypt the encrypted program content.

In other embodiments, at least some of the encrypted program content 212 may be provided via the access control information distribution system 204. As a non-limiting example, the program content distribution system 202 may be a satellite network, and the access control information distribution system 204 may be some other separate system, at least in part for the final portion that delivers the access control information 210 to the receiving device 118. In such an example, the program content distribution system 202 may provide portions, such as a few seconds out of every minute of programming, of the program content 208 only via the other system (the access control information distribution system 204), such that only receiving devices 118 that may be properly authenticated (e.g., receiving devices that are associated with paying customers) via the access control information distribution system 204 can decrypt and subsequently present the program content in its entirety and without interruption.

Upon receiving the encrypted program content 212 and the access control information 210, the receiving device 118 decrypts the received encrypted program content 212 by using the received access control information 210. As noted above, the access control information 210 may include keys that may be used by an implementation of a symmetric encryption algorithm to both encrypt and/or decrypt program content. Once the receiving device 118 has decrypted the received encrypted program content 212, the unencrypted program content may be communicated by the receiving device 118 to an associated presentation device 120.

In some embodiments, the access control information 210 may itself be encrypted by the program distributor 106 prior to being provided to the receiving device 118 via the access control information distribution system 204. The access control information 210 may be encrypted by way of an identifier or key, such as a subscription key, service key, user key, hardware identifier, or the like, that is uniquely associated with the receiving device 118, a user associated with the receiving device 118, and/or a group of receiving devices 118, such as a group of receiving devices 118 associated with customers that all have subscribed or otherwise paid to access particular program content.

In at least one embodiment, the access control information 210 may be generated and/or encrypted based on various types of information about the receiving device 118. Such information may include, for example, the identity of a customer associated with the receiving device 118; the geographic location of the receiving device 118, such as may be determined by, for example, the street address, city, or postal code of the location at which the receiving device is being utilized; capabilities of the receiving device; or other suitable identifiers indicating an access right to the encrypted program content 212.

C. Receiving Device Overview

Figure 3:
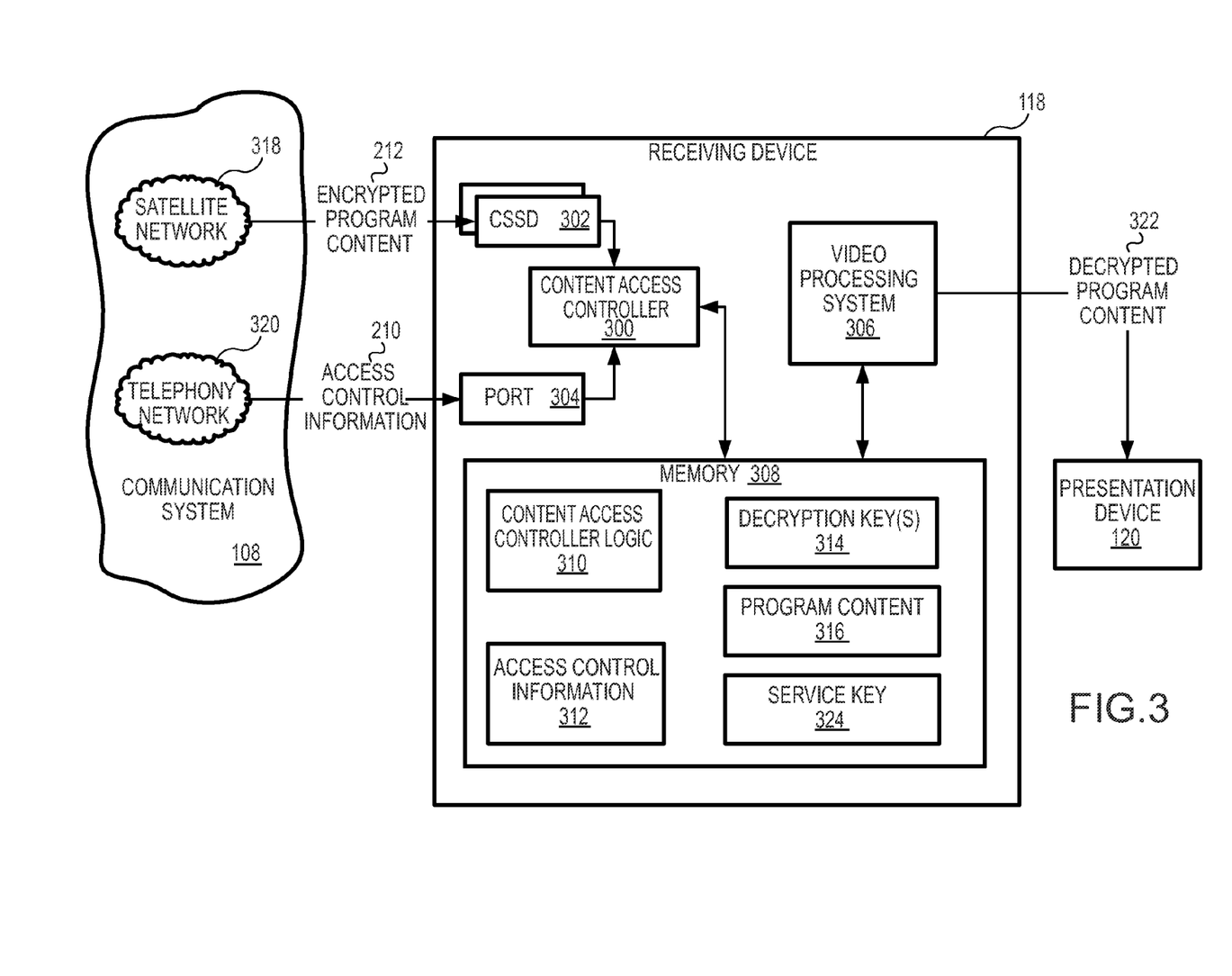
FIG. 3 is a block diagram illustrating an example embodiment of a content access controller implemented in a receiving device.

FIG. 3 is a block diagram illustrating an example embodiment of a content access controller 300 implemented in a receiving device 118. In the illustrated embodiment, a receiving device 118 comprises a content access controller 300, one or more content stream selection devices (CSSDs) 302, a port 304, a video processing system 306, and a memory 308. Content access controller logic 310, access control information 312, decryption key(s) 314, service keys 324, and program content 316 reside in the memory 308. Other devices, components, and/or logic that are not illustrated may also be included in the receiving device.

The receiving device 118 receives encrypted program content 212 from a satellite network 318 via the CSSD 302. The satellite network 318 is a non-limiting example of a program content distribution system 202 as described with reference to FIG. 2, above. The CSSD 302 may include any device capable of obtaining data, such as the encrypted program content 212, from a signal used by the program content distribution system 202, and providing the obtained data to some other device, such as the content access controller 310. In the illustrated embodiment, the CSSD 302 includes a tuner that is configured to tune to a particular frequency or frequency band that is used to carry the encrypted program content 212 over the satellite network 318. In addition, the CSSD 302 may include other components, such as a demodulator, a demultiplexer, etc. In another embodiment, a content stream selection device may comprise some other type of communication device or module, such as an Ethernet interface, a cable modem, a USB ("Universal Serial Bus") port, a serial port, etc.

The receiving device 118 separately receives access control information 210 from a telephony network 320 via the port 304. Telephony network 320 is a non-limiting example of an access control information distribution system 204 as described with reference to FIG. 2, above. The port 304 may be a modem, coupler, or other device configured to communicate information between the receiving device 118 and the access control information distribution system 204, such as, but not limited to, telephony network 320. The telephony network 320 may comprise one or more of a fixed line analog system, a fixed line digital system, a wireless system, or the like. In other embodiments, the port 304 may be any other communication interface device or module, such as an Ethernet interface, a cable modem, a USB ("Universal Serial Bus") port, a serial port, etc.

The content access controller 300 executes instructions contained in the content access controller logic 310 in order to manage access to the encrypted program content 212. In an embodiment, the content access controller 300 receives the encrypted program content 212 from the CSSD 302 and the access control information 210 from the port 304. At least some of the received encrypted program content 212 may be stored, prior to decryption, in the memory 308 at program content 316. At least some of the received access control information 210 may be stored in the memory 308 at access control information 312. Storing the encrypted program content 212 and/or the access control information 210 may include buffering, storing, writing, saving, caching, or the like, the data in or to the memory 308 and/or some other data repository, such as an optical disk, magnetic disk, database, or the like.

In addition, the content access controller 300 decrypts received encrypted program content 212 to produce decrypted program content 322. The decrypted program content 322 may be optionally stored, buffered, or the like, at program content 316 and/or may be transmitted by the video processing system 306 to the presentation device 120 for presentation. In addition, the decrypted program content 322 may be re-encrypted for various other purposes, such as in service of further access control mechanisms and/or systems. For example, prior to being communicated to the presentation device 120, the decrypted program content 322 may be re-encrypted with an encryption key, such as a hardware identifier, associated with the presentation device 120, such that program content is only viewable on authorized presentation devices. In another embodiment, prior to being stored at program content 316, decrypted program content may be re-encrypted with an encryption key, such as a hardware identifier, associated with the receiving device 120, such that program content cannot easily be transferred to other systems/devices configured to present the program content, such as personal computers, personal media players, etc.

The content access controller 300 determines one or more decryption keys 314 based on the access control information 312. The determined decryption keys 314 may be optionally stored in the memory 308, or stored in another suitable memory. Determining a decryption key 314 may include identifying, generating, decrypting, and/or otherwise obtaining a decryption key 314 based on the access control information 312 and/or other information, such as an identifier associated with user and/or the receiving device 118, such as a unique hardware identifier, a service key, a user password, current date and/or time, etc.

As a non-limiting example, access control information 210 may include a decryption key 314 that is encrypted with a service key 324. Service key 324 may be issued to the receiving device 118 upon the occurrence of a particular event, such as payment for a particular program and/or service package by a user associated with the receiving device 118. The service key 324 may be communicated to the receiving device 118 via the telephony network 320 and/or some a second access control information distribution system. This service key 324, in turn, may be utilized to decrypt encrypted access control information 210 containing one or more content decryption keys 314. Service key 324 may be used to validate decryption keys 314 in some embodiments.

As noted, a signal received from a program content distribution mechanism, such as the satellite network 318, may include a plurality of multiplexed programs. In various embodiments, the encrypted program content 212 may be demultiplexed before, during, and/or after decryption by the content access controller 310. For example, in one embodiment, the encrypted program content 212 may be demultiplexed by the CSSD 302 prior to decryption, such that the content access controller 310 only decrypts a single selected program content stream. In another embodiment, the encrypted program content 212 may be decrypted by the content access controller 310 prior to being demultiplexed for purposes of program selection. Other variations are possible, such as initially decrypting a portion (e.g., a packet header) of the received encrypted program content 212, demultiplexing the received program content based on the decrypted information, and then further decrypting one or more selected program content streams.

The program distributor 106 and the receiving device 118 may comprise one or more commercially available central processing units. For example, the secure content provider 206, the video processing system 306, and/or the content access controller 300 may include or be an ARM microprocessor, a MIPS microprocessor from MIPS Technologies, an 80×86 or Pentium series microprocessor from Intel Corporation, U.S.A., a PowerPC microprocessor from IBM, a SPARC microprocessor from Sun Microsystems, Inc., a PA-RISC series microprocessor from Hewlett-Packard Company, a 68xxx series microprocessor from Motorola Corporation, or the like. In addition, special purpose or custom processing devices may be utilized, such as DSPs ("Digital Signal Processors"), ASICs ("Application Specific Integrated Circuits"), FPGAs ("Field Programmable Gate Arrays"), or the like. Any such other embodiments of the secure content provider 206, the video processing system 306, and/or the content access controller 300, now known or later developed, are intended to be within the scope of this disclosure.

The secure content distribution system 200, and/or its portions thereof, may be implemented in a distributed environment comprising multiple, even heterogeneous, computer systems and systems. For example, in one embodiment, the secure content provider 206, the program content 208, the access control information 210, and the encrypted program content 212 are all located in physically different computer systems. In another embodiment, the functions of the video processing system 306 and the content access controller 300 may be performed by a different arrangement of components of the receiving device 118, including a greater or lesser number of components. In yet another embodiment, the content access controller 300 may be external to the receiving device 118, such as part of an external device that is connected between the satellite network 318 and the receiving device 118.

D. Example Content and Access Control Information Data Flows

Figure 4:
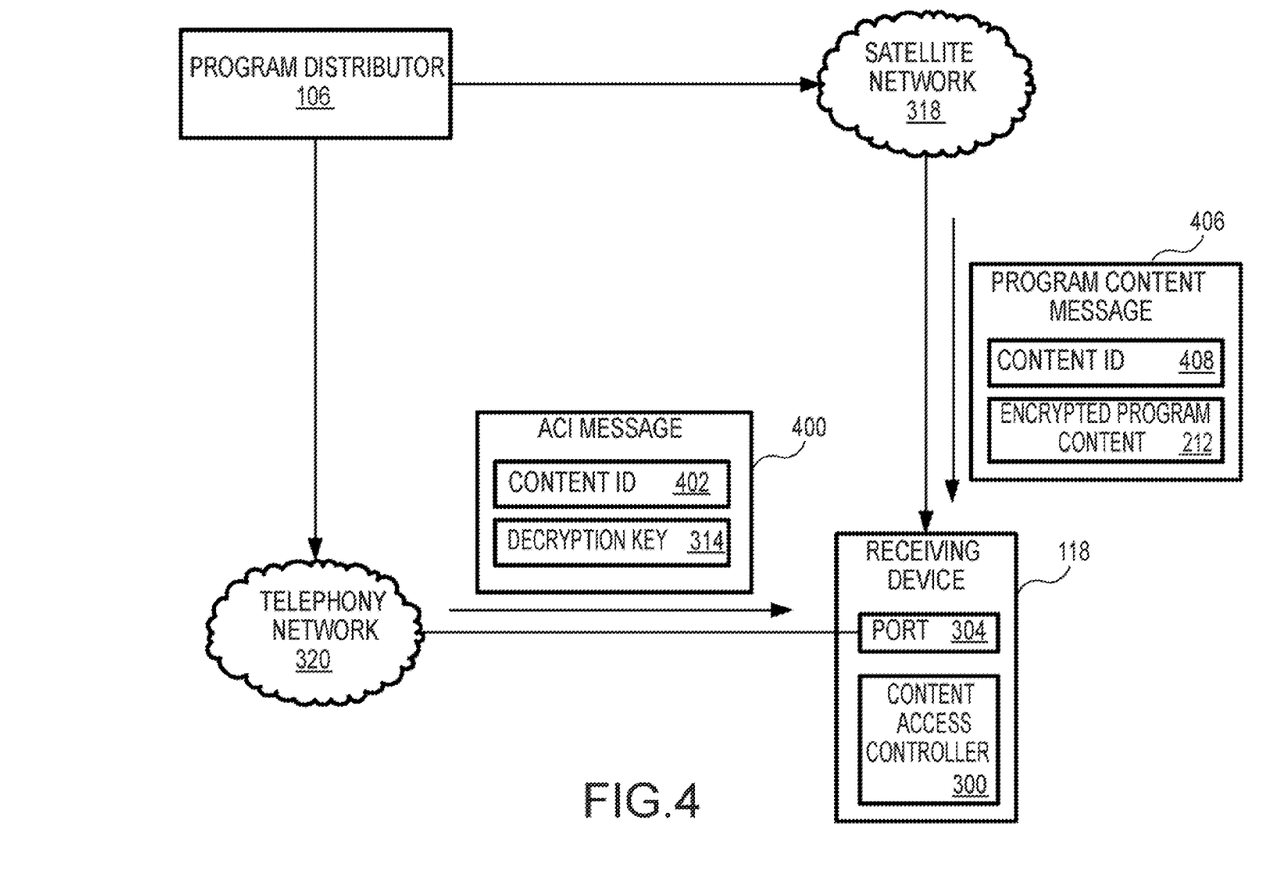
FIG. 4 is a block diagram illustrating a first example of the distribution of encrypted program content and access control information.

FIG. 4 is a block diagram illustrating a first non-limiting example of the distribution of encrypted program content 212 and access control information 210. In particular, FIG. 4 illustrates an access control information ("ACI") message 400 transmitted by a program distributor 106 via a telephony network 320 to a receiving device 118. In addition, the program distributor 106 transmits a program content message 406 via a satellite network 318 to the receiving device 118. The telephony network 320 and the satellite network 318 are non-limiting examples of an access control information distribution system 204 and a program content distribution system 202, respectively.

The illustrated ACI message 400 comprises a content identifier ("ID") 402 and a decryption key 404. The content ID 402 may be used by the receiving device 118 to identify encrypted program content 212 that is associated with the decryption key 404, such as encrypted program content 212 may be decrypted with the decryption key 404. At least some of the contents of the ACI message 400, such as the content ID 402 and/or the decryption key 404, may be encrypted, such that unauthorized receiving devices, for example, receiving devices operated by a user who has not paid for particular program content, cannot easily obtain access to the information needed to decrypt received encrypted program content 212. The ACI message 400 may be encrypted in various ways, such as with a symmetric key that is associated with the receiving device 118, such as a hardware identifier, a smart card identifier, or the like. In some embodiments, the ACI message 400 is or includes an Entitlement Control Message ("ECM"). In other embodiments, the ACI message 400 may be formatted in some other standard or proprietary format. For example, the ACI message 400 may be a networking data structure, such as a datagram, IP packet, or the like, that includes one or more data units that represent access control information.

The illustrated program content message 406 comprises a content ID 408 and encrypted program content 212. The encrypted program content 212 may include one more data portions each including information about a particular program. For example, the encrypted program content 212 may include one or more frames, or portions of frames, of video, audio, and/or data associated with a particular television program, radio program, film, or the like. In addition, the program content message 406 may include un-encrypted portions of video, audio, and/or data associated with a particular program. In some cases, such un-encrypted portions may be included as part of the encrypted program content 212, or as a different part of the message 406 (not shown).

In addition, the encrypted program content 212 may include information about multiple distinct programs. For example, the encrypted program content 212 may include multiple portions that each correspond to video frames of different television programs. In some embodiments, the encrypted program content 212 may be or include one or more MPEG ("Motion Picture Experts Group") data units, such as MPEG-2 packets and/or frames. In other embodiments, the program content message 406 and/or the encrypted program content 212 may be formatted in some other standard or proprietary format. For example, the program content message 406 may be a networking data structure, such as a datagram, IP packet, or the like, that includes one or more data units that represent program content.

As noted, the content access controller 300 may utilize the content ID 402 obtained in the ACI message 400 to identify encrypted program content 212 that may be decrypted with the received key 404. In the illustrated embodiment, when the content ID 402 obtained from the ACI message 400 matches the content ID 408 obtained from the program content message 406, the content access controller 300 will decrypt the encrypted program content 212 using the key 404 (or a decrypted version of the key). If no match is obtained, the content access controller 300 will not attempt to decrypt the encrypted program content 212 with the received key 404. In this manner, different programs or types/classes of programming can be encrypted using different keys, such that varying types of subscription packages and/or pay-per-view programming can be supported. In addition, a single program can be encrypted using multiple distinct keys, where each key is used to encrypt a particular time period or other portion of the program, such as an audio portion, a segment of a video frame, or the like. In this manner, encryption keys may be changed from time to time, so as to enhance security by increasing the complexity of obtaining unauthorized access.

Figure 5:
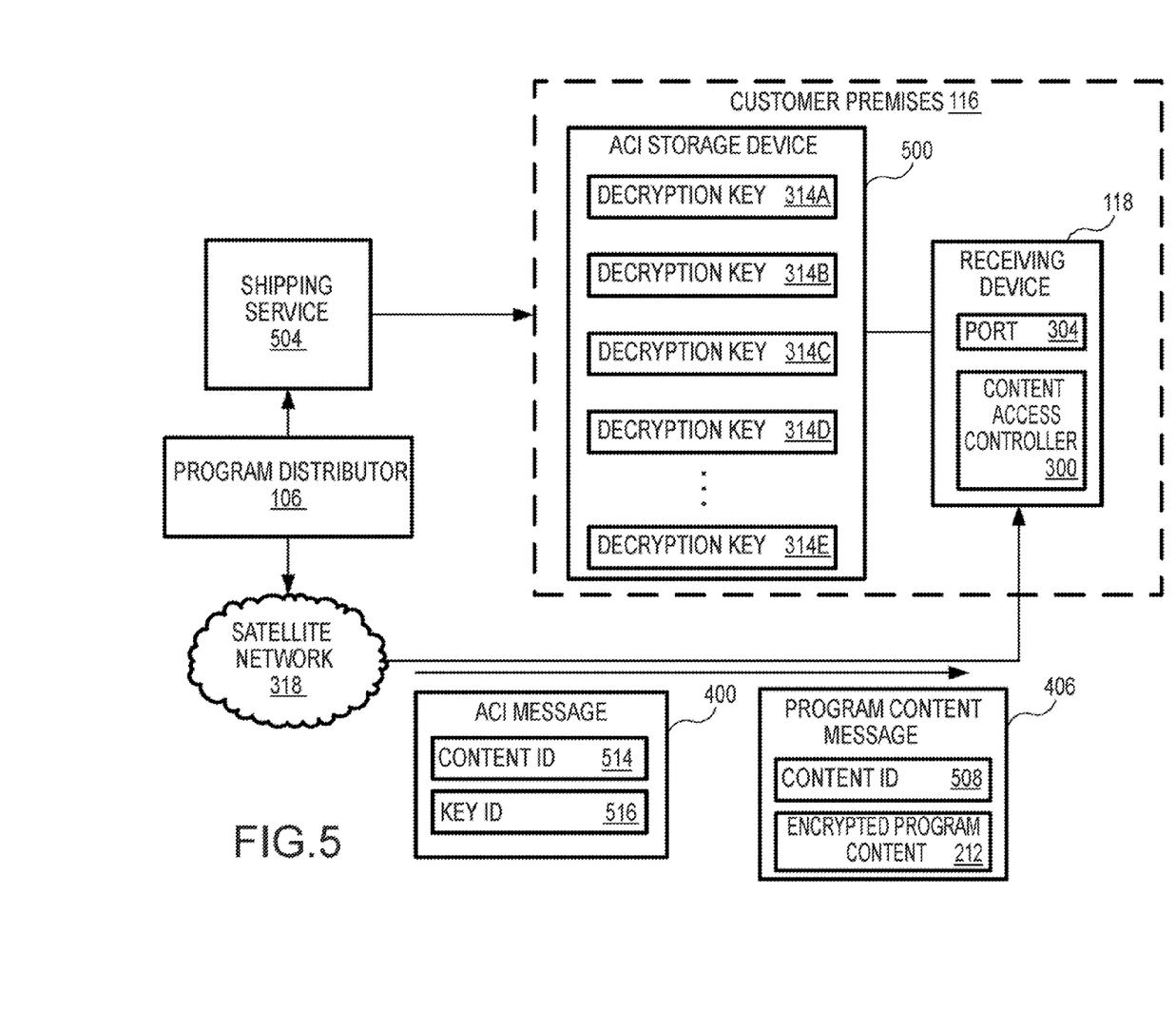
FIG. 5 is a block diagram illustrating a second example of the distribution of encrypted program content and access control information.

FIG. 5 is a block diagram illustrating a second example of the distribution of encrypted program content 212 and access control information 210. In particular, FIG. 5 illustrates an access control information ("ACI") storage device 500 distributed by a program distributor 106 via a shipping service 504 to a customer premises 116. The ACI storage device 500 is communicatively coupled to the receiving device 118 via port 304. In addition, the program distributor 106 communicates a program content message 406 and an access control information message 400 via a satellite network 318 to the receiving device 118.

The shipping service 504 and the satellite network 318 are non-limiting examples of an access control information distribution system 204 and a program content distribution system 212, respectively. Distributing access control information by providing the ACI storage device 500 via a shipping service 504 may be advantageously employed in situations when the receiving device 118 does not have a communication link configured to receive access control information in real time or substantially real time, such as may be the case in a mobile application not having a fixed line or cellular telephony network connection.

The program distributor 106 sends the ACI storage device 500 via shipping service 504 to the customer premises 116. Various shipping services are contemplated, such as a postal service (e.g., U.S. Postal Service), a delivery service (e.g., Federal Express), or the like. In another embodiment, the ACI storage device 500 may be delivered or otherwise provided by an installation service that installs and/or activates the receiving device 118 at the customer premises 116. The ACI storage device 500 may include a large number of decryption keys 314a-314e, which may be used by the content access controller 300 to decrypt received encrypted program content 212. In one embodiment, the ACI storage device 500 is a USB memory stick containing many, even millions of, decryption keys 314a-314e. In other embodiments, other types of physical storage devices may be utilized, such as optical disks, magnetic disks, or the like.

In the illustrated example embodiment, the ACI message 400 includes access control information that may be used by the content access controller 300 to determine a suitable key for decrypting the received encrypted program content 212, such as is contained in the program content message 406. In particular, the ACI message 400 includes a content ID 514 and a key ID 516. The program content message 406 includes a content ID 508 and encrypted program content 212. The key ID 516 may be used to identify one of the keys 314a-314e that may be used to decrypt a program content portion identified by the content ID 514. In particular, when the content ID 514 obtained in the ACI message 512 matches the content ID 508 obtained in the program content message 406, the content access controller 300 will decrypt the encrypted program content 212 using one of the keys 314a-314e, as identified by the key ID 516. For example, key ID 516 may specify that the 23rd key in the memory of the ACI storage device 500 is to be used. In that case, the content access controller 300 will fetch the 23rd key from the memory of the ACI storage device 500, and use that key to decrypt the encrypted program content 212. Otherwise, if no match is obtained, the content access controller 300 will not attempt to decrypt the encrypted program content 212. In general, multiple access control information messages may be streamed along with program content messages. Various ones of the multiple access control messages may be intended for use by one, some, all, or no authorized receiving devices.

In some embodiments, keys or other access control information stored on the ACI storage device 500 may be used in the manner of, or similar to, a one-time pad. In particular, keys from the ACI storage device 500 may be used only once to encrypt a single program or a portion of a program, such that even if a malicious user can obtain a decryption key 314, the obtained decryption key 314 will not be usable for more than the relatively small amount or portion of programming that has been encrypted with it. If the time required to obtain a decryption key 314 by brute force and/or by other computationally intensive techniques is greater than the time amount of programming encrypted with that decryption key 314, then malicious users may be deterred from considering brute force attacks against the access control system 200. One additional advantage to not reusing access control information (or only using for a limited amount or period of content) is that relatively simplistic encryption techniques, such as XOR-ing content data bits with key bits, may be employed. Accordingly, even if a malicious user obtains a particular decryption key 314, that decryption key 314 will not be useable to decrypt any content aside from the particular content with which it was encrypted. Simplistic encryption techniques may typically be efficiently implemented, thereby reducing the computational resources utilized by a particular receiving device 118 or other device performing encryption and/or decryption.

As discussed with reference to FIG. 4, access control information may itself be encrypted to provide an additional layer of security. For example, the contents of the ACI message 400 and/or the ACI storage device 500 may be encrypted with a subscription or other type of key, such that only receiving devices 118 having a valid subscription key can determine the correct key ID 516 and/or decryption key 314 to use to decrypt received encrypted program content 212. In this manner, the ACI storage device 500 may be the same for all users in that every ACI storage device 500 sent to a customer includes an identical set of decryption keys 314a-314e, but only those customers paying for a particular program will be capable of accessing the decryption keys 314a-314e needed to access the particular program. In such an embodiment, ACI storage devices 500 may be mass produced in an economic manner.

Figure 6:
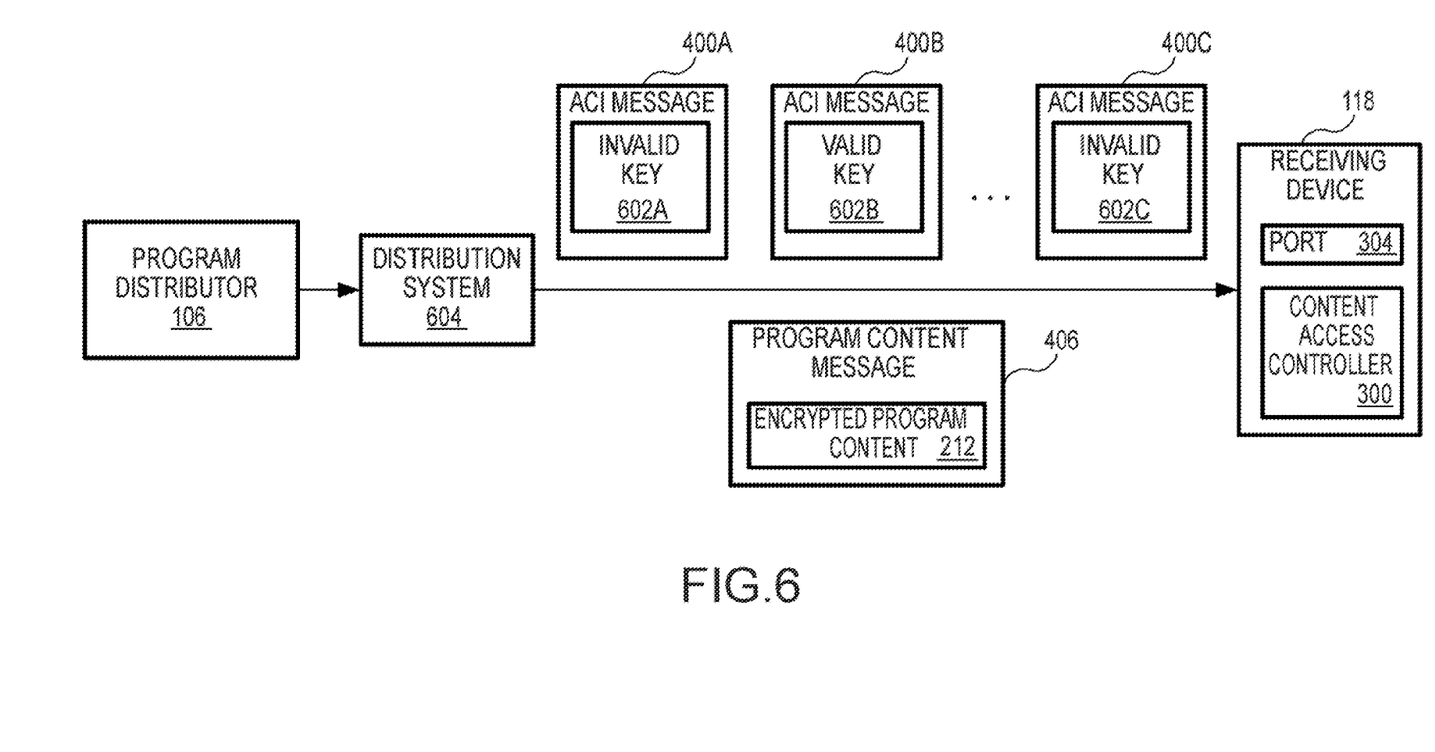
FIG. 6 is a block diagram illustrating a third example of the distribution of encrypted program content and access control information.

FIG. 6 is a block diagram illustrating a third example of the distribution encrypted program content and access control information. FIG. 6 illustrates use of an another technique for controlling access to encrypted program content 212. In particular, FIG. 6 illustrates a technique by which access control information may be communicated in a confidential manner without the use of encryption.

Program distributor 106 sends a program content message 406 containing encrypted program content 212 via a distribution system 604 to a receiving device 118. In addition, the program distributor 106 sends a mixture of valid and invalid access control information to the receiving device 118. Invalid access control information includes access control information that cannot be used to determine a decryption key that is operative to successfully decrypt the received encrypted program content 212.

As a non-limiting example, invalid access control information may include a decryption key that is not operative to correctly decrypt the encrypted program content 212. Valid access control information, in contrast, may be used to determine a decryption key that is operative to decrypt the received encrypted program content 212. For example, valid access control information may include a decryption key that is operative to correctly decrypt encrypted program content 212. Here, the program distributor 106 sends multiple ACI messages 400a-400c via the distribution system 604 to the receiving device 118. Each of the multiple ACI messages 400a-400c includes a respective decryption key 602a-602c. In the illustrated example, key 602b is a valid decryption key, while keys 602a and 602c are invalid decryption keys.

The content access controller 300 is configured to automatically identify valid keys, such as key 602b, and only to use those valid keys to decrypt received encrypted program content 212. This may be accomplished in various ways. As a non-limiting example, each ACI message 400a-400c that includes a valid key may include an authentication code (not shown) based on at least some of the contents of the message, such as the value of the key included in the ACI message, and a secret key, such as an identifier associated with the receiving device 118. Such an authentication code may be generated by use of a cryptographic hash function, such as SHA-256. Every ACI message 400a-400c that includes an invalid key may include an authentication code that is randomly determined. The receiving device 118 can then distinguish which ACI messages 400a-400c include valid keys by computing the authentication code using the secret key and at least some of the message contents, such as the value of the key included in the ACI message. If the computed authentication code matches the authentication code included in the ACI message 400, then the ACI message 400 includes a genuine key. Note that the ACI messages 400a-400c here are communicated without being encrypted. This is possible because the presence of fake keys will frustrate the ability of an unauthorized receiving device 118 to present content in a coherent manner.

In the illustrated example, both ACI messages 400a-400c and program content messages 406 are distributed via distribution system 604. However, in other embodiments, ACI messages 400a-400c and program content messages 406 may be distributed via distinct distribution systems, such as is described with respect to FIGS. 4 and 5, above.

In other embodiments, the described technique for confidentially communicating information without encryption may be utilized with respect to other data communicated between the program distributor 106 and the receiving device 118. For example, given sufficient bandwidth, valid program content may itself be sent from the program distributor 106 along with invalid program content, such that a party or device that is not configured to distinguish between the two types of content would not be able to view or otherwise access the genuine program content in a coherent manner. The described technique for confidentially communicating information without encryption may be advantageous in jurisdictions that place export restrictions on the use and/or implementation of cryptographic techniques.

Although various example data and/or message flows have been illustrated in FIGS. 4-6, other variations are possible. For example, additional or other types of information may be communicated between a program distributor 106 and a receiving device 118. In one embodiment, other types and/or formats of access control information may be communicated, such as Entitlement Management Messages ("EMMs"). In another embodiment, various types of information related to customers and/or users may be communicated. For example, payment information such as a credit card account number of a customer associated with a receiving device 118 may in some cases be provided by a receiving device to a program distributor in order to effect payment for a subscription and/or particular program. In another embodiment, a receiving device 118 may periodically provide information to a program distributor regarding a viewing history recorded by the receiving device, such as a record of television programs viewed over the last 24-hour period. Some or all of such information may be securely communicated using at least some of the techniques described herein.

E. Processes

Figure 7:
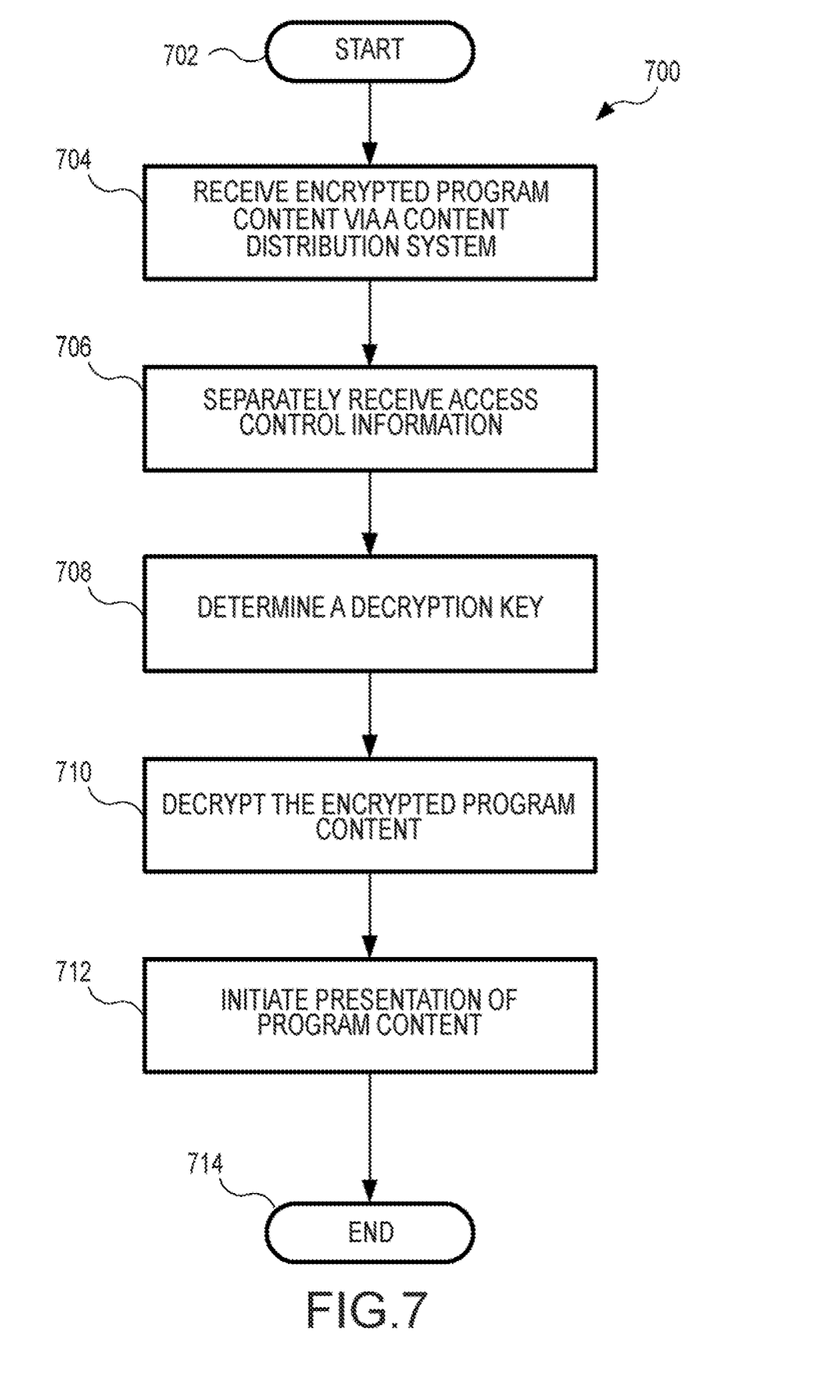
FIG. 7 is a flow diagram of a content access controller process.
Figure 8:
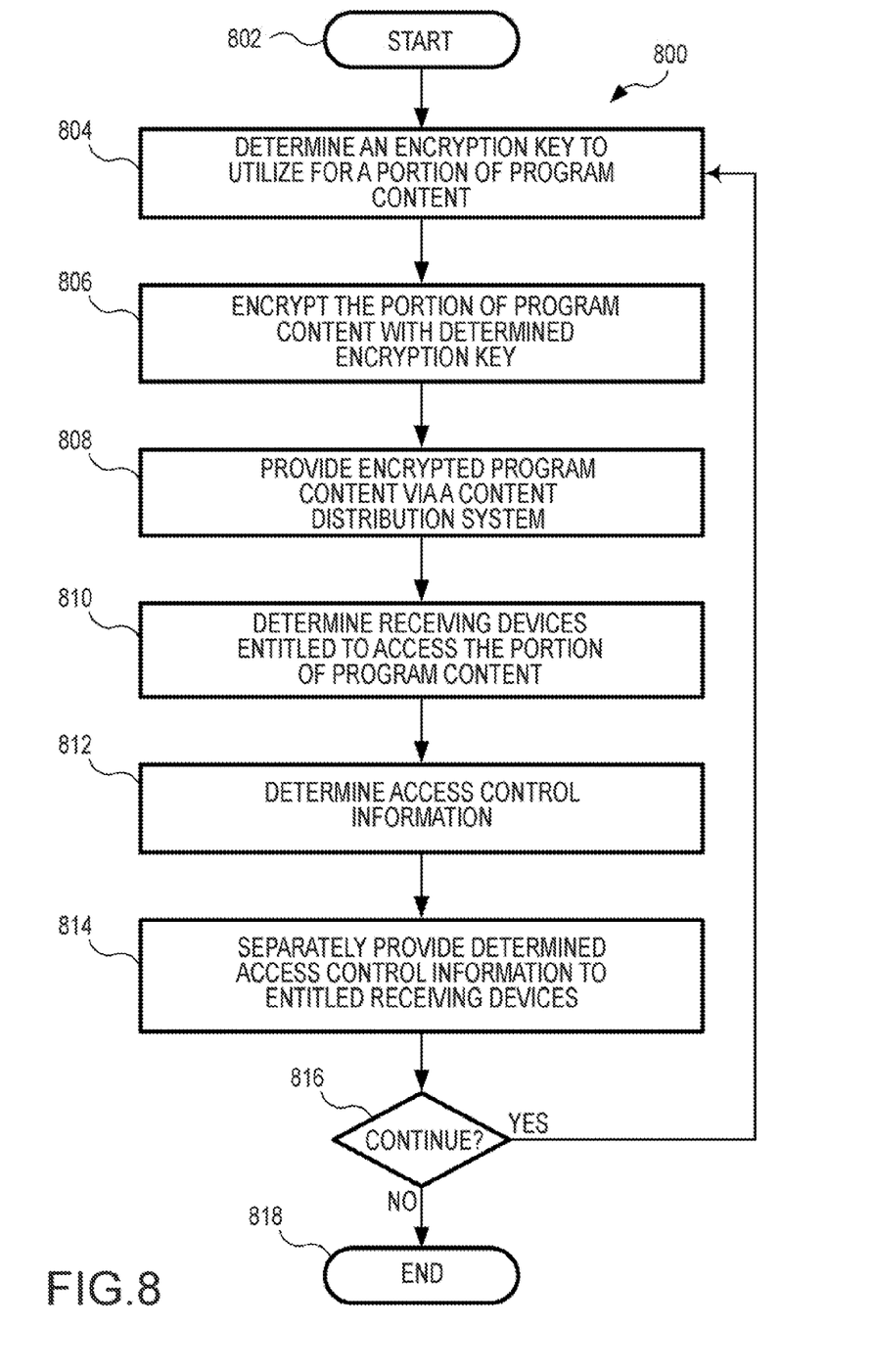
FIG. 8 is a flow diagram of a secure content provider process.

FIGS. 7 and 8 include flowcharts of processes 700 and 800, respectively, used by an embodiment of a secure content distribution system 200 (FIG. 2). In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

FIG. 7 is a flow diagram of a content access controller process 700. The process 700 may be implemented by, for example, but not limited to, one or more hardware, firmware, and/or software modules, components, and/or devices, such as are illustrated in the receiving device 118 described with reference to FIG. 3, including the content access controller 300, the content access controller logic 310, and/or the video processing system 306. The process 700 includes receiving encrypted program content 212 and access control information 210 via distinct distribution systems, and using the received access control information 210 to decrypt the received encrypted program content 212 for purposes such as presentation on a presentation device 120, such as rendering video to a display, playing audio via a speaker 126, or the like.

The process 700 starts at 702. At 704, the content access controller 300 receives encrypted program content 212 via a program content distribution system 202. The encrypted program content 212 may be received from a program distributor 106 via a program content distribution system 202, such as a satellite, cable, or telephone network. In the illustrated example, the encrypted program content 212 has been with a secret key that is shared between the program distributor 106 or other source of the program content and the receiving device 118. Receiving encrypted program content 212 may include receiving multiple program content messages 406 and/or portions that are encrypted using distinct keys.

At 706, the content access controller 300 receives access control information 210 via an access control information distribution system 204 that is distinct from the program content distribution system 202. Receiving access control information 210 may include receiving one or more access control information messages 406 each including one or more distinct decryption keys 314 operable to decrypt distinct encrypted content portions received at 704. In addition, the received access control information 210 may include identifiers that may be used to associate the received access control information 210 with received encrypted program content 212. For an added layer of security and subscription model flexibility, the received access control information 210 is itself encrypted with a subscription key that is associated with the receiving device 118.

The access control information 210 may be received from, for example, the program distributor 106 that also provided the encrypted program content 212 received at 704, above. The access control information distribution system 204 may include one or more of a wired or wireless system, a tangible item distribution system, such as the postal service, or the like. In some embodiments, the content access controller 300 may initiate a telephone call or other connection to the program distributor 106, in order to obtain access control information 210 associated with the received encrypted program content 212. In other embodiments, the program distributor 106 may from time to time push via a connection access control information 210 associated with the received encrypted program content 212.

At 708, the content access controller 300 determines a decryption key 314 based on the received access control information 210. In the illustrated example, determining the decryption key 314 includes decrypting the access control information 210 to recover the secret decryption key 314 contained therein. Determining the decryption key 314 may also include associating each of multiple received decryption keys 314 with each of multiple received encrypted content portions, such that the appropriate decryption key 314 may be utilized to decrypt the associated program content.

At 710, the content access controller 300 decrypts the encrypted program content 212 with the determined decryption key 314. Decrypting the received encrypted program content 212 may be accomplished by performing the inverse of the encryption function used to originally encrypt the program content, using the determined key 314 and the encrypted program content 212 as inputs, and providing decrypted program content 322.

At 712, the content access controller 300 initiates presentation of program content. Initiating presentation of the program content may include providing the decrypted program content 322 directly to a presentation device 120 configured to display the program content 322, providing decrypted program content 322 to a device, such as a graphics card, operable to convert the program content 322 into a signal displayable by a display, re-encrypting the decrypted program content obtained at 710 with a session or fixed key before provision to the presentation device 120, or the like. In other embodiments, the routine may store the decrypted program content 322, possibly in re-encrypted or otherwise protected form, for future viewing.

At 714, the process ends. The illustrated process may be performed repeatedly by the content access controller 300, in order to process encrypted program content 212 received from a program distributor 106 and/or some other source.

FIG. 8 is a flow diagram of secure content provider process 800. The process 800 may be provided by, for example, one or more hardware, firmware, and/or software modules, components, and/or devices, such as are illustrated in the program distributor 118 described with reference to FIG. 2, including the secure content provider 206. The process 800 includes encrypting program content, determining access control information, and distributing the encrypted program content and access control information to one or more receiving devices or other devices operable and/or authorized to access the program content.

The process 800 starts at 802. At 804, the secure content provider 206 determines an encryption key to utilize for a portion of program content. A portion of program content may include a segment of one or more programs, up to and including entire programs. Program content portions may also be based on frames, blocks, packets, or other data units that result as a consequence of a data compression, network communication, or other activity. Encryption keys may be determined in various ways, such as by randomly selecting and/or generating symmetric encryption keys with a cryptographically secure pseudorandom number generator.

At 806, the secure content provider 206 encrypts the portion of program content with the determined encryption key and produces encrypted program content 212. If symmetric encryption is utilized, the program content may be encrypted by various known and/or proprietary techniques, such as DES, AES, or the like.

At 808, the secure content provider 206 provides the encrypted program content 212 generated at 806 via a program content distribution system 202. Providing the encrypted program content 212 may include sending, transmitting, forwarding, or otherwise communicating the encrypted program content 212 to one or more receiving devices 118 via a program content distribution system 202, such as a satellite network, cable system, or the like At 810, the secure content provider 206 determines one or more receiving devices 118 entitled to access the encrypted program content 212. This determination may be based on information about subscribers or other customers that have paid, or are otherwise authorized, for access to the encrypted program content 212. For example, if the encrypted program content includes all or a portion of pay-per-view program, the receiving devices 118 entitled to access the program may be only those associated with customers that have ordered the pay-per-view program in advance. Or, if the encrypted program content 212 includes all or a portion of a program that is part of subscription package, such as a bundle of one or more television program channels, movie channels, or the like, the receiving devices 118 entitled to access the program may be only those associated with customers that have accounts and are up-to-date with their monthly payments.

At 812, the secure content provider 206 determines access control information 210 possibly based on the determined encryption key and the entitled receiving devices. Determining access control information 210 may include determining a decryption key 314 that is operable to decrypt the encrypted program content 212. When a symmetric encryption algorithm is used, the determined decryption key 314 will be equivalent to the encryption key. Determining access control information may include encrypting the access control information such that the access control information can only be accessed by authorized receiving devices 118. For example, the decryption key 314 may be encrypted with a second key, such as a service key, encryption key, or the like, associated with the entitled receiving devices 118. In some embodiments, the access control information 210 may be differently encrypted for each entitled receiving device 118, such as based on a unique, private hardware identifier and/or user access code associated with the device. In other embodiments, the access control information 210 may be encrypted in the same manner for a plurality of entitled receiving devices 118, such as those devices associated with customers having paid for a particular subscription. Keys and/or other information that may be used to decrypt or otherwise gain access to the access control information 210 may also be securely communicated to the receiving devices 118 using techniques similar to those described herein and/or other known or proprietary techniques for facilitating confidential communication.

At 814, the secure content provider 206 provides the determined access control information 210 to the entitled receiving devices via an access control information distribution system 204 that is distinct from the content distribution system 202. Providing the access control information 210 may include responding to requests for the access control information 210 received from, for example, a remote receiving device 118 that is communicating with this secure content provider 206 via the access control information distribution system 204. In some cases, this may include first authorizing and/or authenticating the receiving device 118, such as by requesting that the receiving device 118 provide a secret password or other identifier.

In one embodiment, receiving devices 118 may communicate with the secure content provider 206 via network connections, such as HTTP connections, FTP connections, TELNET connections, or the like, for purposes of authentication and secure communication of access control information 210. Such a network connection may itself be configured to provide a layer of access control, such as by automatically encrypting all data communicated via the connection, such as may be performed by an HTTPS connection, an SSH connection, or the like. Other techniques and/or mechanisms may also be employed, singly or in various combinations, to provide access control information, such as by communicating access control information to a single receiving device, to a group of receiving devices, along with non-essential and/or invalid information that is not readily discernable as such by unauthorized receiving devices, by delivery in whole or in part via a physical item delivery service, by employing quantum cryptographic methods, in a time expiring manner, etc.

At 816, the secure content distributor 206 determines whether to continue, and if so, continues at 804. If not, the secure content provider 206 proceeds to operation 818, where it ends. In this manner, the secure content provider 206 may execute continuously, providing encrypted program content 212 and associated access control information 210 to receiving devices 118. The secure content provider 206 may also respond to changing conditions, such as variations in the number, kind, type, and/or amount of program content, access control information, subscription packages, receiving devices 118, or the like. The secure content provider 206 may determine not to continue upon the occurrence of various events, such as when the secure content provider 206 is restarted or powered down.

In other embodiments, the process 800 may include additional functions, such as tracking information about receiving devices 118 that have communicated with the secure content provider 206. For example, if the access control information distribution system 204 utilizes a telephone network, the caller ID and/or other identifying information associated with the recording device (e.g., IP address) may be logged or otherwise recorded, in order to assist efforts to discover the identities of persons who attempt to obtain access control information and/or program content without proper authorization.

It is to be appreciated that in some embodiments the functionality provided by the processes discussed above may be provided in other ways, such as being split among more processes or consolidated into fewer processes. Similarly, in some embodiments illustrated processes may provide more or less functionality than is described, such as when other illustrated processes instead lack or include such functionality respectively, or when the amount of functionality that is provided is altered. In addition, while various operations, actions, and/or activities may be illustrated as being performed in a particular manner and/or in a particular order (e.g., in serial), those skilled in the art will appreciate that in other embodiments the operations may be performed in other orders and in other manners (e.g., in parallel).

It is also appreciated that data structures discussed herein, such as ACI messages 400 and/or program content messages 406, may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

While various embodiments have been described hereinabove, it is to be appreciated that various changes in form and detail may be made without departing from the spirit and scope of the invention(s) presently or hereafter claimed.

The invention claimed is:

1. A method to manage access to program content, the method comprising:
receiving, by a computer processor, a plurality of portions of encrypted program content;
receiving, by the computer processor, at a port communicatively coupled to an access control information distribution system and operable to receive access control information from the access control information distribution system, for one portion of the plurality of portions of encrypted program content, a plurality of decryption keys and a portion identifier associated with the one portion, via a communications network, the plurality of keys includes:
one valid decryption key operable to correctly decrypt the associated one portion of encrypted program content,
a plurality of invalid decryption keys inoperable to correctly decrypt the associated one portion of encrypted program content, and
an authentication code associated with the one valid decryption key;
utilizing, by a content access controller computer processor, the authentication code included in the received plurality of decryption keys associated with the one portion, to identify the one valid decryption key from the plurality of received decryption keys; and
decrypting, by the content access controller computer processor, the one portion of encrypted program content with the valid decryption key.

2. The method of claim 1 wherein the received authentication code is derived at least from the one valid decryption key and a hardware identifier associated with a receiving device.

3. The method of claim 2, wherein utilizing the authentication code to identify the one valid decryption key comprises:
for each of the received plurality of decryption keys, deriving a code at least from the decryption key and the hardware identifier associated with the receiving device; and
if the derived code matches the authentication code, identifying the decryption key used in deriving the code as the valid decryption key.

4. The method of claim 1 comprising:
requesting the received decryption keys from a sender of the received encrypted program content.

5. An apparatus that manages access to encrypted program content, the apparatus comprising:
a content stream selection section operable to receive a plurality of portions of encrypted program content via a content distribution system;
a port communicatively coupled to an access control information distribution system, the port operable to receive access control information from the access control information distribution system, each of the access control information comprising a decryption key and a portion identifier, the portion identifier associated with one portion of the received plurality of portions of encrypted program, the port further operable to:
for each one portion of the plurality of portions of encrypted program, electronically receive a valid decryption key operable to correctly decrypt the one portion;
for the each one portion, electronically receive a plurality of invalid decryption keys inoperable to correctly decrypt any of the portion of the plurality of portions of encrypted program; and
for the each one portion, receive an authentication code associated with the valid decryption key; and
a content access controller communicatively coupled to the port and to the content stream selection section, the content access controller operable to, for the each one portion, utilize the authentication code to identify the valid decryption key from the plurality of received decryption keys,
the content access controller further operable to, for the each one portion, decrypt the each one portion with the identified valid decryption key.

6. The apparatus of claim 5 wherein the access control information distribution system is separate from the content distribution system.

7. The apparatus of claim 5 wherein the control information distribution system is a telephony network.

8. The apparatus of claim 5 wherein the content distribution system comprises an Internet Protocol system.

9. The apparatus of claim 5 wherein the access control information is encrypted based at least in part on a subscription key, a service key, a hardware identifier associated with the receiving device, and a current time/date.

10. The apparatus of claim 5 further comprising:
a memory coupled to the content access controller, the memory operable to store the plurality of valid decryption keys.

11. The apparatus of claim 5 wherein the content stream selection device comprises a tuner and a demodulator.

12. A system that manages access to encrypted program content, the system comprising:
a receiving device operable to receive the encrypted program content from a first system, the receiving device operable to receive access control information over a second system at a port communicatively coupled to the second system and operable to receive the access control information from the second system, and wherein the received encrypted program content comprises a plurality of encrypted program portions,
wherein the receiving device is operable to decrypt the encrypted program content based on the access control information, including a portion identifier for each of the plurality of encrypted program portions, to generate program content, and operable to communicate the program content to a presentation device,
wherein the receiving device is further operable to, for each of the plurality of encrypted program portions:
electronically receive a valid decryption key operable to correctly decrypt the received encrypted program content portion;
electronically receive a plurality of invalid decryption keys inoperable to correctly decrypt the received encrypted program content portion;
electronically receive an authentication code associated with the valid decryption key; and
utilize, by a content access controller communicatively coupled to the port, the authentication code to identify the valid decryption key from the plurality of received decryption keys.

13. The system of claim 12 wherein a portion of the first system is physically separate from a portion of the second system.

14. The system of claim 12 wherein the receiving device comprises:
a content stream selection section communicatively coupled to the first system and operable to receive the encrypted program content from the first system;
wherein the content access controller is operable to decrypt the received encrypted program content based on the received access control information.

15. The system of claim 12 wherein the port comprises:
a modem operable to receive the access control information from a communications network.

16. The system of claim 15 wherein the content stream selection device is operable to receive the encrypted program content from a satellite network.

17. The system of claim 12 wherein the receiving device is a set-top box.

18. The system of claim 12 wherein at least one of the portions includes an MPEG frame.

19. The system of claim 12 further comprising:
a memory operable to communicatively couple to a content access controller of the receiving device, the memory storing a plurality of decryption keys, wherein the access control information identifies one of the plurality of decryption keys that is operable to correctly decrypt the received encrypted program content, and wherein the content access controller is operable to decrypt the received encrypted program content with the identified decryption key.

20. A non-transitory computer-readable medium whose contents enable a processing system to manage access to program content, by performing a method comprising:
receiving encrypted program content via a content distribution system, the encrypted program content comprising a plurality of portions of encrypted program content;
receiving access control information via an access control information distribution system, the access control information distribution system being at least in part physically distinct from the content distribution system, wherein for each portion of the plurality of portions of encrypted program content, the receiving the access control information comprises:
electronically receiving a valid decryption key operable to correctly decrypt the each portion;
electronically receiving a plurality of invalid decryption keys inoperable to correctly decrypt the each portion; and
electronically receiving an authentication code associated with the valid decryption key;
for each portion of the plurality of portions, determining valid decryption key based on the received access control information, the valid decryption key operable to correctly decrypt the each portion of plurality of portions of encrypted program content, the determining including utilizing the authentication code to identify the valid decryption key from the plurality of received invalid decryption keys; and
for each portion of the plurality of portions, decrypting the each portion of the plurality of portions of encrypted program content with the determined valid decryption key.

21. The non-transitory computer-readable medium of claim 20 wherein the access control information distribution system comprises an Internet Protocol system.

22. The non-transitory computer-readable medium of claim 20 wherein the non-transitory computer-readable medium is a memory in a computing device.

23. The non-transitory computer-readable medium of claim 20 wherein the contents are instructions that when executed cause the computing system to perform the method.

* * * * *